United States Patent [19]

Okada

[11] Patent Number: 4,836,445

[45] Date of Patent: Jun. 6, 1989

[54] VEHICLE HEATING SYSTEM

[75] Inventor: Masaki Okada, Kawasaki, Japan

[73] Assignee: Isuzu Motors Limited, Tokyo, Japan

[21] Appl. No.: 82,092

[22] Filed: Aug. 5, 1987

[30] Foreign Application Priority Data

Sep. 12, 1986 [JP] Japan ................ 61-213815

[51] Int. Cl.[4] .................................. G05D 23/00
[52] U.S. Cl. .................. 237/2 A; 237/12.3 C
[58] Field of Search ............ 237/12.3 A, 12.3 B,
237/12.3 C, 5, 2 A, 12.4, 32, 33, 34, 35, 36

[56] References Cited

U.S. PATENT DOCUMENTS

| | | | |
|---|---|---|---|
| 3,304,004 | 2/1967 | Hraboweckyj | 237/12.3 C |
| 3,758,031 | 9/1973 | Moran | 237/12.3 C |
| 4,010,895 | 3/1977 | Kofink et al. | 237/12.3 C |

FOREIGN PATENT DOCUMENTS 252018 12/1985 Japan .
59876 4/1986 Japan .

Primary Examiner—Henry A. Bennet
Attorney, Agent, or Firm—Browdy and Neimark

[57] ABSTRACT

In a vehicle heating system, heat exchange is made between a combustion gas generated by a burner of a heater and water by a heat exchanger of the heater and the hot water heated by the heat exchanger is sent into a cooling water heater unit of the vehicle for heating. The hot water for heating the vehicle can be obtained by change-over control of a change-over valve from the hot water of the heat exchanger or from the hot water of a radiator of an engine. Furthermore, the combustion gas generated by the burner is sent into an intake or exhaust pipe of the engine.

4 Claims, 6 Drawing Sheets

VEHICLE HEATING SYSTEM

BACKGROUND OF THE INVENTION

1. Field of the Invention

This invention relates to a vehicle heating system equipped with a heater which can operate independently of a car engine.

2. Description of the Prior Art

Vehicle heating systems are disclosed in Japanese Patent Laid-Open No. 252018/1985 and Japanese Utility Model Laid-Open No. 59876/1986.

First of all, the vehicle heating system described in Japanese Patent Laid-Open No. 252018/1985 will be explained with reference to FIG. 6 of the accompanying drawings. In this vehicle heating system, a burner 104 for burning a fuel is disposed in an intake pipe 103 of an engine 101 and a heat exchanger 105 is disposed downstream of the burner 104 in order to provide heat exchange between the combustion gas generated by burning the fuel by the burner 104 and the air for heating, and the heating air thus heated is used for heating the car.

Next, the warming-up means of the engine described in Japanese Utility Model Laid-Open No. 59876/1986 will be explained with reference to FIG. 7. In the warming-up means, an intake detour circuit 4 is disposed in parallel with an intake pipe 3 of an engine 1 at an intermediate part of the intake pipe 3, a burner 5 and a heat exchanger 8 communicating with a car heater unit 9 are disposed sequentially in this intake detour circuit 4 and a pressure control valve 12 is disposed in the intake pipe 3 bypassing the intake detour circuit 4. The burner 5 is connected via a fuel pipe 6 to a fuel injection pump 32' fitted to the engine 1 and fuel from a fuel tank 11 is burnt by the burner 5 disposed in the intake detour circuit 4. The air outlet side of the heat exchanger 8 is connected to the heater unit 9 of the car so that the hot air warmed up through heat exchange with the combustion gas of the burner having carburetor means 7 flows into the heater unit 9.

A check valve 15 such as a lead valve is disposed upstream of a confluence point of the intake detour circuit 4 with the intake pipe 3 to prevent suction air from the intake pipe 3 side from entering the intake detour circuit 4 at its downstream side. A pressure control valve 12 is disposed at the portion of the intake pipe 3 where it bypasses the intake detour circuit 4. This pressure control valve 12 is disposed in order to keep always constant a differential pressure of the intake pipe 3 between upstream and downstream of the safety valve 12. This valve 12 includes an arm 12b which is fitted to a rotary shaft 12a and connected to a rod 13c formed projectingly from a diaphragm 13a of a diaphragm type actuator 13. A spring chamber 13b of the actuator 13 is connected to a negative pressure sensor 14 disposed in the intake pipe 3 downstream of the pressure control valve 12 by a communication pipe 13d, so as to introduce the pressure downstream of the pressure control valve 12 into the spring chamber 13b.

In the vehicle heating system shown in FIG. 6 and in the engine warming-up means shown in FIG. 7, the combustion gas is introduced into the intake pipe of the engine after passing through the heat exchanger of the heater, and the air for combustion which is sent in the burner of the heater is taken into from the air cleaner for the engine. As to the heat exchanger of the heater, heat exchange is made between the combustion gas and the heating air, that is, on the gas-to-gas basis. Accordingly, if the combustion gas mixes accidentally into the heating air during heat exchange between them, the combustion gas might enter the car. If unburnt gases such as CO, HC, and the like, are contained in this combustion gas, a critical problem that might prove fatal to the occupant may arise.

Furthermore, the size of a piping arrangement must be increased or a blower having a higher capacity must be disposed to minimize resistance in the case of air, depending upon types or models of cars, but such means are difficult to employ because of a limited capacity of a power source. In the case of the combustion gas, or in the case of the gas-to-air heat exchange, an air conditioner unit of a carburetor must be changed or modified structurally and this results in a more complicated construction and a more troublesome fitting work. Moreover, the heating system itself becomes more expensive, and still another problem will develop in that the heating air will be overheated when the car stops abruptly.

SUMMARY OF THE INVENTION

To eliminate the problems of the prior art described above, the present invention is directed to provide a vehicle heating system which uses water for heat-exchanging the combustion gas generated in a burner of a heater at a heat exchanger to make heat exchange between the combustion gas generated by the burner and the heating water and which is highly safe because it does not employ direct heat exchange between the combustion gas and heating air, to prevent the combustion gas of the burner from entering the car.

It is another object of the present invention to provide a vehicle heating system which stops the operation of the burner only after cooling water circulating through the radiator of an engine reaches the level of hot water suitable for warming the car, can selectively control this hot water and the hot water heated by the burner by means of a change-over valve, can rapidly heat the cabin at first by the burner and heat the cabin by the engine while the operation of the burner is stopped after the cooling water is heated, and thus provides an energy saving effect.

It is still another object of the present invention to provide a vehicle heating system which can be constructed by merely arranging the cooling water circulating through the radiator of the engine and the hot water heated by the burner to be changeable-over by a change-over valve, has simple mountability to cars in terms of a piping arrangement and can be fitted to existing vehicles by changing slightly the design and can minimize the production cost.

It is still another object of the present invention to provide a vehicle heating system which feeds the combustion gas generated in the burner into the intake pipe or exhaust pipe of the engine and processes the combustion gas of the burner by the engine and consequently, is extremely safe, and can operate the heater to heat the cabin while the engine stops.

It is a further object of the present invention to provide a vehicle heating system which can utilize effectively the exhaust heat, that is, the heat of the combustion gas, can save energy, and is free from possible fire by use of water for heat exchange even if a blower or the like is out of order and from overheat even if a car stops abruptly, and hence is extremely safe.

It is still another object of the present invention to provide a vehicle heating system which can use pipelines having a reduced diameter as the piping arrangement for heating and can apply easily to cars or vehicles having a cab-tiltable structure.

It is still another object of the present invention to provide a vehicle heating system which can operate a heater, particularly only a heater of a quick heating system, independently of the engine, can pre-heat cooling water of the engine and can thus improve startability of the engine.

DESCRIPTION OF THE PREFERRED EMBODIMENT

Hereinafter, one preferred embodiment of the present invention will be described with reference to the accompanying drawings.

Figure 1:
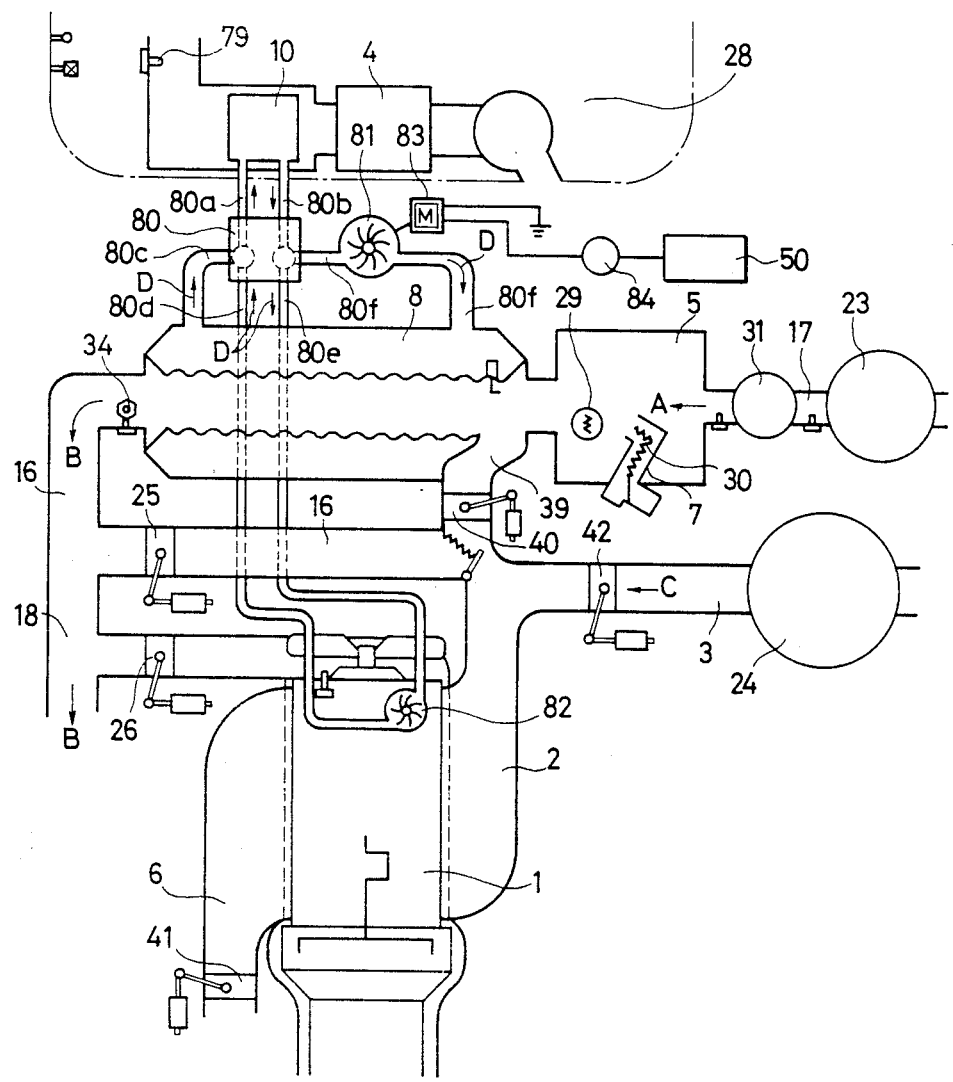
FIG. 1 is a schematic diagram showing the basic construction of a vehicle heating system in accordance with the present invention.

FIG. 1 illustrates the basic construction of a vehicle heating system as one embodiment of the present invention. This vehicle heating system applies to a car to which a quick heating system QHS is mounted. This quick heating system QHS includes primarily a blower 31, a burner 5 and a heat exchanger 8 that are disposed sequentially in order named and can attain quick heating by use of the burner 5 and the heat exchanger 8 as will be described later.

Carbureter means 7 is disposed in the burner 5 and a first air cleaner 24 for an engine is disposed at an upstream part of an intake pipe 3 of the engine 1. A silencing valve 42 is disposed in the intake pipe 3 upstream of a confluence point of a combustion gas passage 16 of the heater and the intake pipe 3. The intake pipe 3 downstream of the silencing valve 42 communicates with an intake manifold 2. A change-over valve 25 for engine suction and a change-over valve 26 for atmospheric discharge (see FIG. 4) are disposed in order to selectively pass the combustion gas generated in the heater to a combustion gas passage 16 for discharging the gas to the intake pipe 3 of the engine 1 or another combustion gas passage 18 for discharging it to the atmosphere in response to the open/close operation of an exhaust brake valve 41.

The exhaust brake valve 41 described above is disposed in the exhaust pipe 6 upstream of the confluence point of the combustion gas passage 18 of the heater and the exhaust pipe 6 of the engine 1. A second air cleaner 23 is disposed upstream of the blower 31. In the heater described herein, the combustion gas generated in the burner 5 is subjected to heat exchange with water in the heat exchanger 8 and the hot water thus heated in then subjected to heat exchange with air in a cooling water heater unit 10 disposed in the car so that the air is turned to hot air and used for heating the cabin 28 of the car.

A flow path 80f for passing the water into the heat exchanger 8 and a flow path 80c for passing the heated water, that is, the hot water, from the heat exchanger 8 are disposed in the heat exchanger 8. A water pump 81 for the heat exchanger is disposed in the flow path 80f. This water pump 81 is driven by a motor 83 while the motor 83 is subjected to ON/OFF control by a switch 84 operated by a signal from a main control unit 50. The flow paths 80c and 80f are connected to a change-over valve assembly 80. The change-over valve assembly 80 communicates with the cooling water heater unit 10 through the flow paths 80a and 80b. The change-over valve assembly 80 is also connected to the engine 1 through flow paths 80d and 80e to cool the engine 1. A water pump 82 for the engine is incorporated in the flow paths 80d and 80e. As to the circulation of the water for the heat exchanger 8, a water pump 81 which is smaller than the water pump 82 for circulating the cooling water of the engine 1 and driven separately is disposed for circulation.

Furthermore, a thermostat housing consisting of electromagnetic valves or the like, that is, the change-over valve assembly, is disposed between the conventional cooling water heater unit 10 and the engine 1 in order to keep a balance with the temperature of the cooling water on the side of the engine 1, and to circulate the water directly to the cooling water heater unit 10 as desired by a user, or to circulate it partially mixed with the cooling water of the engine 1. Therefore, the cooling water heater unit 10 having the conventional structure can be used sufficiently and no design change or modification is necessary. Moreover, since the heater of the quick heating system QHS is employed, the time from ignition of the burner 5 till delivery of the hot wind to the seats such as a driver's seat can be made extremely short, such as about 3 minutes. In such a case, the water amount circulating between the heat exchanger 8 and the cooling water heater unit 10 is preferably up to about 5 l, for example.

Incidentally, reference numeral 79 in the drawings represents a temperature sensor for sensing the temperature of the air for heating, 17 is a combustion gas passage, symbol A represents a flowing direction of the air for combustion, B is the flowing direction of the combustion gas, C is the flowing direction of the intake air of the engine and D is the flowing direction of water for heating.

Figure 2:
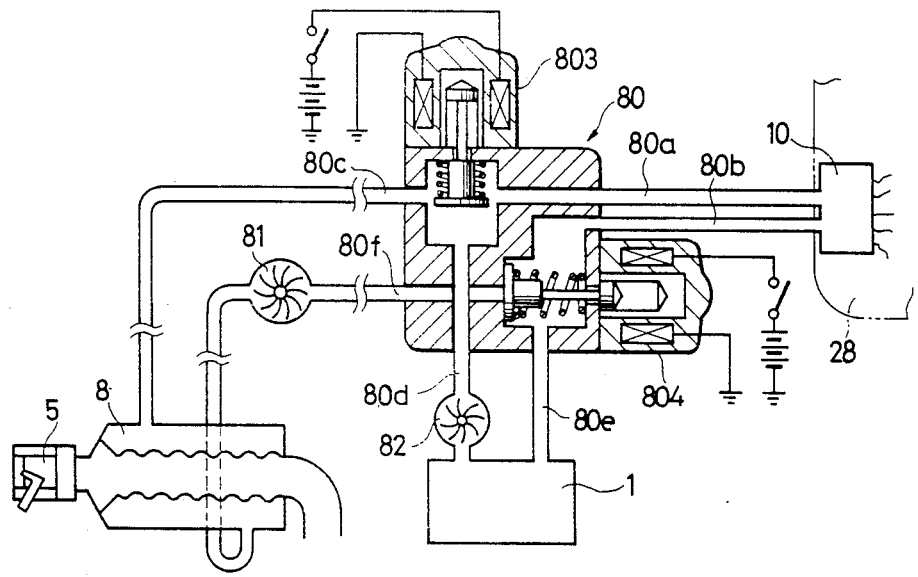
FIG. 2 is a schematic diagram showing an example of a heat exchanger portion, particularly a change-over valve assembly, shown in FIG. 1.

FIG. 2 shows the relationship between the flow path of the circulating water for the heat exchanger 8 and the flow path of the cooling water of the engine 1 as well as the detailed structure of the change-over valve assembly 80. Change-over valves 803, 804 which are electromagnetic valves are incorporated in the change-over valve assembly 80 and open and close the flow paths 80d and 80f, respectively. When the change-over valve 804 closes the flow path 80f while the change-over valve 803 opens the flow path 80d, they open the path ranging from the water pump 82 for engine→ flow path 80d→ change-over valve assembly 80→ flow path 80a→ cooling water heater unit 10 in cab→ flow path 80b→ change-over valve assembly 80→ flow path 80e→ engine 1→ water pump 82, and cut off the path ranging from the water pump 81 for heat exchanger→ heat exchanger 8→ flow path 80c→ change-over valve assembly 80→ flow path 80a→ cooling water heater unit 10 in cab→ flow path 80b→ change-over valve assembly 80→ flow path 80f→ water pump 81.

When the change-over valve 804 opens the flow path 80f while the change-over valve 803 closes the flow path 80d, they open the flow path ranging from the water pump 81 for heat exchanger→ heat exchanger 8→ flow path 80c→ change-over valve assembly 80→ flow path 80a→ cooling water heater unit 10 in cab→ flow path 80b→ change-over valve assembly 80→ flow path 80f→ water pump 81 and cut off the path ranging from the water pump 82 for engine→ flow path 80d→ change-over valve assembly 80→ flow path 80a → cooling water heater unit 10 in cab→ flow path 80b → change-over valve assembly 80→ flow path 80e→ engine 1→ water pump 82.

Figure 3:
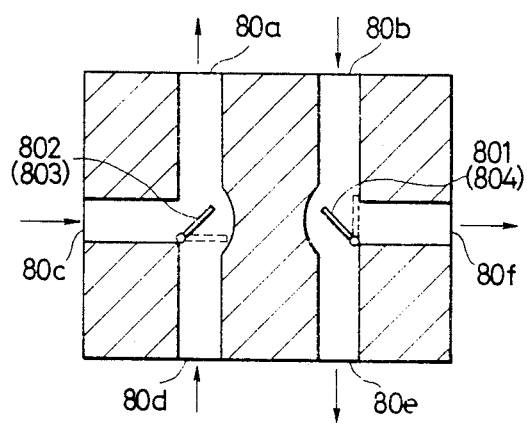
FIG. 3 is a schematic view showing another example of the change-over valve assembly shown in FIG. 2.
Figure 3A:
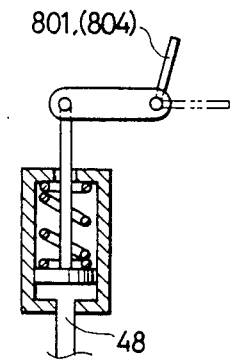
FIG. 3A is a schematic view showing the change-over valve shown in FIG. 3.

FIG. 3 shows another example of the change-over valve assembly 80. Though the change-over valve shown in FIG. 2 is the electromagnetic valve, the change-over valve shown in FIG. 3 is of a fluid operation type using air 48 but exhibits the same function as the electromagnetic valve shown in FIG. 2. Therefore, the explanation of the function will be omitted.

Figure 4:
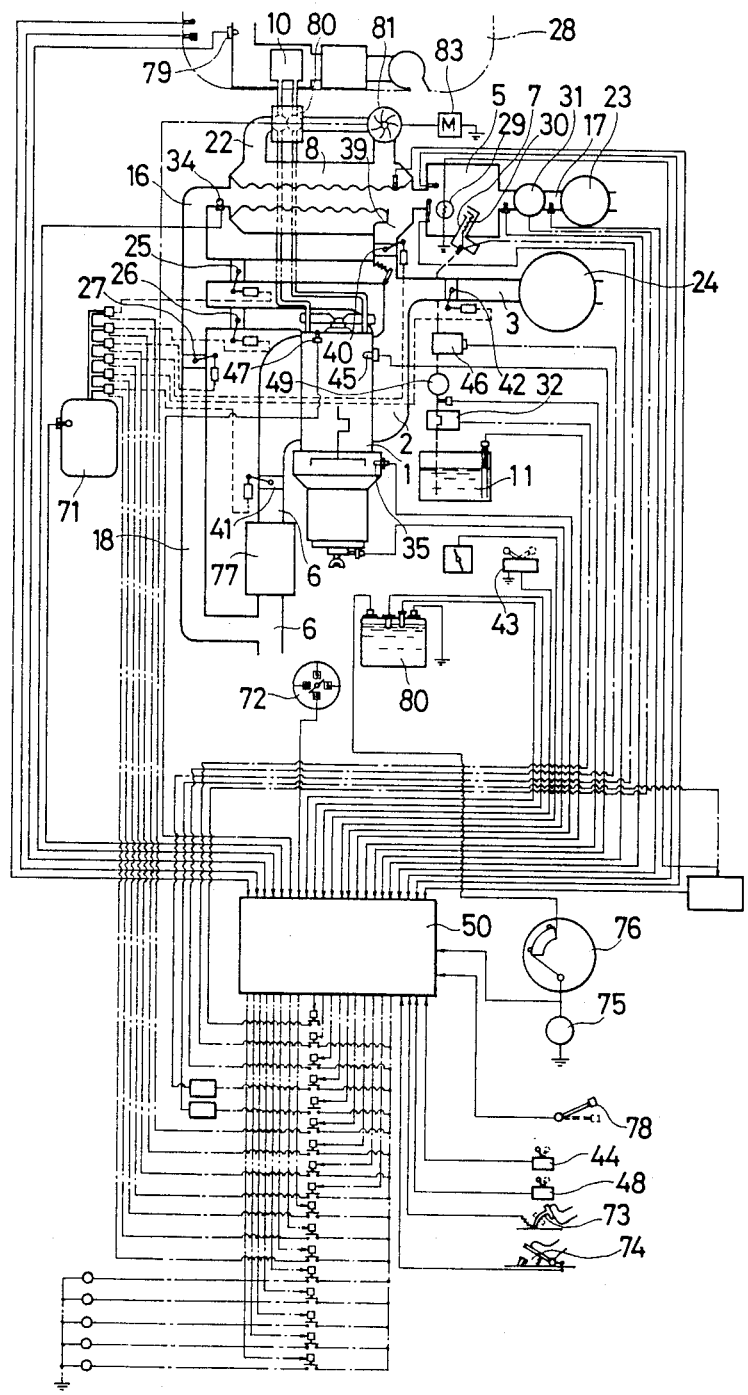
FIG. 4 is a schematic diagram showing a vehicle heating system and its control unit in accordance with the present invention.

FIG. 4 shows an example where the vehicle heating system of the invention shown in FIG. 1 applies to a car together with its control unit. In the components of the vehicle heating system shown in FIG. 4, like reference numerals are used to identify like components as in FIG. 1, and the explanation of such components will be omitted.

In the burner 5, the liquid fuel is sent from the fuel tank 11 into the carbureter means 7 through the fuel pump 32, the fuel filter 49 and the return valve 46. The burner 5 is constructed in such a manner that the liquid fuel is vaporized by the carbureter means 7 to generate a gasified fuel, the resulting fuel is burnt and its combustion gas is sent into the heat exchanger 8. The intake pipe 3 of the engine 1 and the combustion air passage 17 for sucking the air for combustion are connected to separate air cleaners 23 and 24, respectively. The first air cleaner 24 for the engine is disposed at an upstream portion of the intake pipe 3 and has a function of relatively cleaning the air. The second air cleaner 23 having a different function from that of the first air cleaner 24 is disposed at an upstream portion of the combustion air passage 17. This air cleaner 23 may be composed of a relatively rough, or coarse, filter and in such a case, the intake resistance of air is low and hence, suction capacity of the blower 31 may be small and its power comsumption may be small, too.

In the vehicle heating system shown in FIG. 4, various functions can be attained by ON/OFF controlling the change-over valve 25 for engine intake, the change-over valve 7 for opening to the atmosphere, the change-over valve 26 for keeping the engine temperature and the change-over valve 40 for the combustion gas passage 39. In other words, it is possible to auxiliarily start and warm up the engine by use of the combustion gas after heat exchange in accordance with a given condition by ON/OFF controlling the change-over valve 25 for the engine suction, the change-over valve 27 for opening to the atmosphere, the change-over valve 26 for maintaining the engine temperature and the change-over valve 40 for the combustion gas passage 40.

In the drawing, reference numeral 43 represents an operation switch of the quick heating system QHS; 44 is an operation switch for keeping the engine temperature which introduces the combustion gas to the outer surface of the engine 1, that is, to the outer surface of the cylinder block, the oil pan, and the like; 45, 47 and 79 are temperature sensors; 48 is an engine suction instruction switch which instructs whether or not the exhaust gas or the combustion gas is to be sucked manually into the intake pipe of the engine 1; 50 is a main control unit; 71 is an air tank for storing the air compressed by the engine 1 or the like; 72 is a timer as an optional item; 73 is a clutch signal switch for inputting a ON/OFF signal of the clutch; 74 is an accelerator step-in sensor generating a signal representing whether an accelerator pedal is free or somewhat stepped in; 75 is a starter for the engine 1; 76 is a key switch of the engine starter or the like disposed at the driver's seat; 77 is a silencer; 78 is an exhaust brake operation switch for cutting off the exhaust brake valve 41 to operate the exhaust brake; and 80 is a battery.

It is preferred to use a burner having the following construction, for example, as the burner 5 described above, though its detail is not shown in the drawing. A preferred example will be described with reference to FIG. 4.

This burner 5 consists of a ceramic combustion cylinder, which is divided into a carbureter chamber and a combustion chamber by a partition having communication holes. The carbureter means 7 with a built-in glow plug 30 for gasification is disposed in such a manner as to penetrate through the combustion chamber and a jet port for jetting the gasified fuel gasified by the carbureter is open to the carbureter chamber, and a glow plug 29 for ignition is disposed in the carbureter chamber. The liquid fuel is gasified by the gasification glow plug 30 into the gasified fuel and mixed with the air for combustion to form an air-fuel mixture. Oil droplets that exist in a very limited quantity or the air-fuel mixture is ignited by the ignition glow plug 29 to burn the air-fuel mixture in the combustion chamber. When the burner 5 described above is used, the liquid fuel can be gasified rapidly into the gasified fuel, which is ignited rapidly and can be burnt rapidly. As a result, the burner 5 can immediately feed the combustion gas into the heat exchanger 8 to let is rapidly exhibit its function. In this manner, the cabin 28 of the car can be heated rapidly.

The vehicle heating system of the invention having the construction described above operates in the following way. First of all, the fundamental operating conditions of this vehicle heating system will be described. The vehicle heating system shown in FIG. 1 sets the change-over valve 25 so that even when the engine 1 is at halt, the heater consisting of the burner 5 and the heat exchanger 8 can be operated independently of the engine. The exothermic quantity obtained by the burner 5, that is, the combustion gas, is fed into the heat exchanger 8 and, after subjected it is to heat exchange, it is sent into the intake pipe 3 of the engine 1 through the combustion gas passage 16 or into the combustion gas passage 18 which opens to the atmosphere.

When both the engine 1 and the heater operate simultaneously and moreover, when the combustion gas generated by the burner 5 of the heater is to be drawn into the engine 1, the change-over valve 25 is set to the open side with respect to the intake pipe 3. The combustion gas is sent into the engine 1 and completely burnt there. In this manner, high safety can be secured. In this case, the cooling water is not yet heated before and immediately after the start of the engine 1. Therefore, the change-over valve assembly 80 is operated so that the car can be heated by the heater of the quick heating system QHS which is disposed independently of the engine 1. Next, when the cooling water of the engine 1 is heated sufficiently and can be used for heating, the change-over valve assembly 80 is operated so that the heating independent of the engine 1 is stopped, and only the cooling water of the engine 1 is used for heating the car. The controlling operations described above can be accomplished by operating the change-over valve assembly 80 as described above.

When the heater operates while the engine 1 is at halt, control is provided so that the change-over valve 25 is closed with respect to the intake pipe 3 but is open to the combustion gas passage 18 connected to the exhaust pipe 6 for opening to the atmosphere. Under this state, the combustion gas flows smoothly to the atmosphere due to the operation of the blower 31. In the heat exchanger 8, heat exchange is effected between the combustion gas from the burner 5 and water so that the water is heated and turned to hot water, which is then sent into the cooling water heater unit 10 and used for quickly heating the cabin 28.

Figure 5:
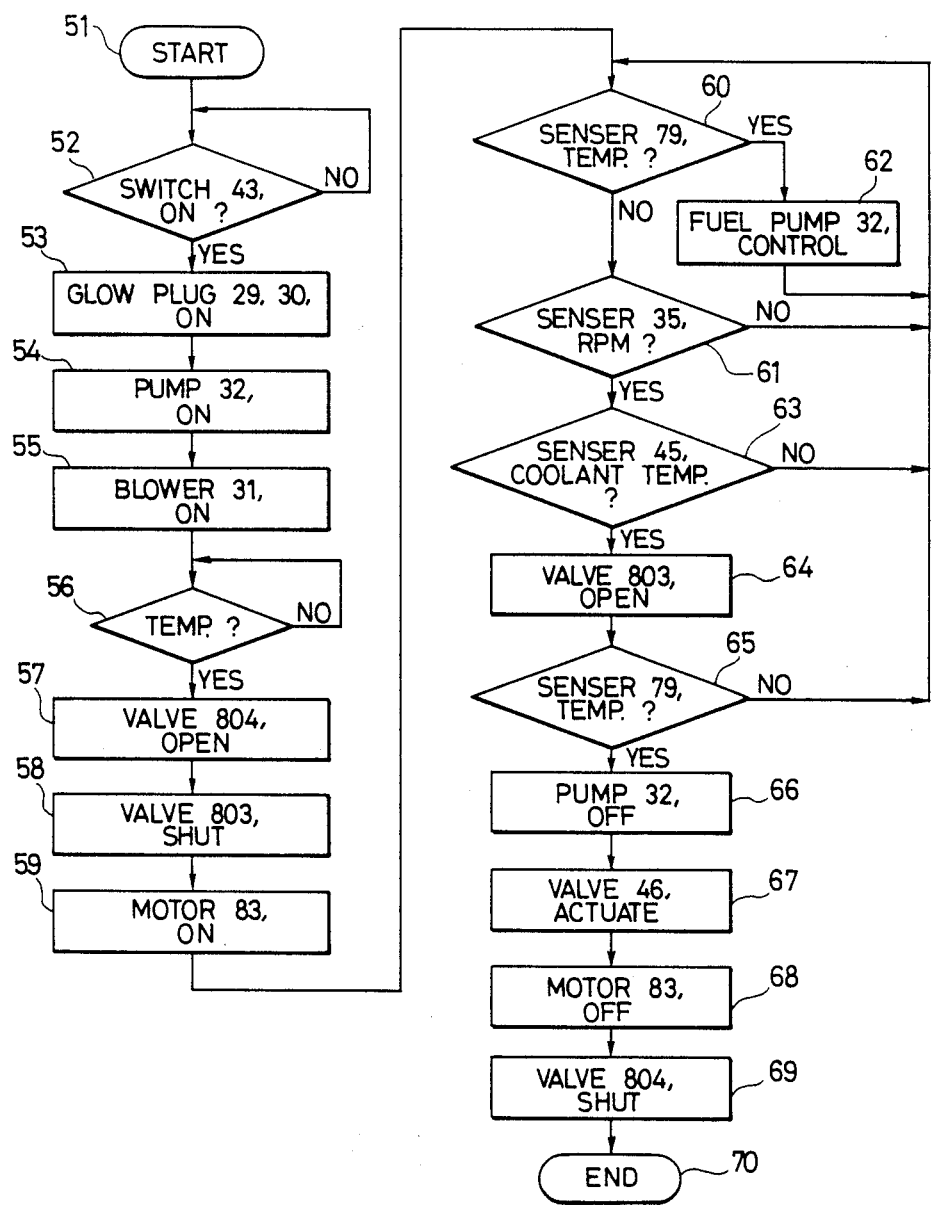
FIG. 5 is a flowchart useful for explaining the operation state of the vehicle heating system in accordance with the present invention.
Figure 6:
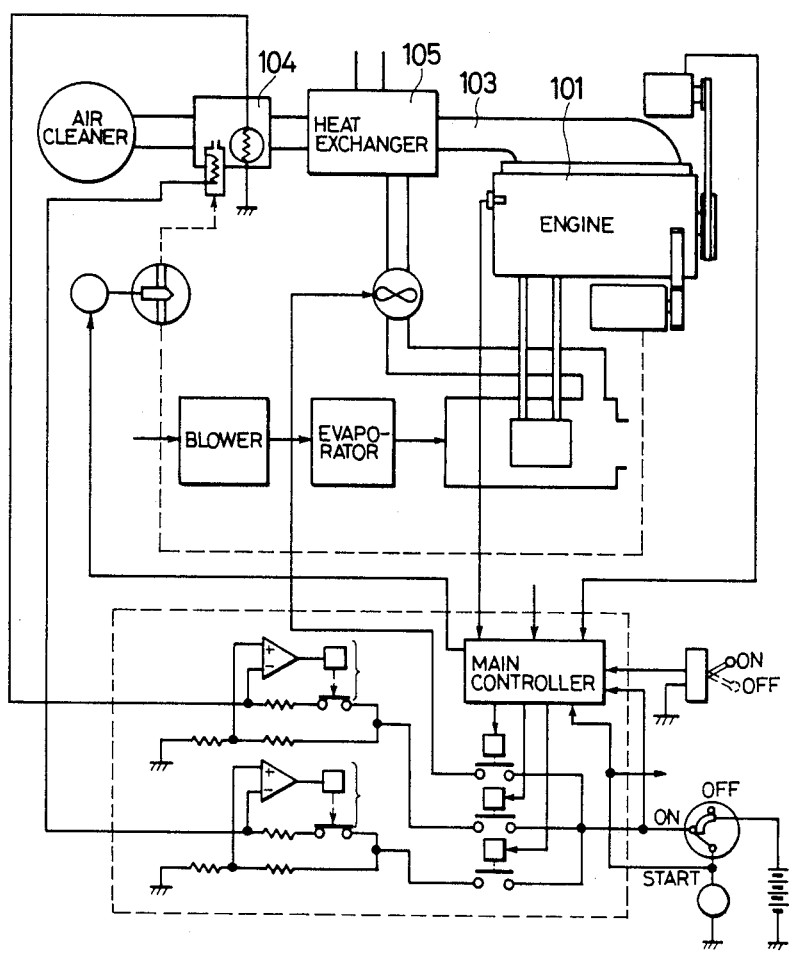
FIG. 6 is a schematic diagram showing a conventional vehicle heating system.
Figure 7:
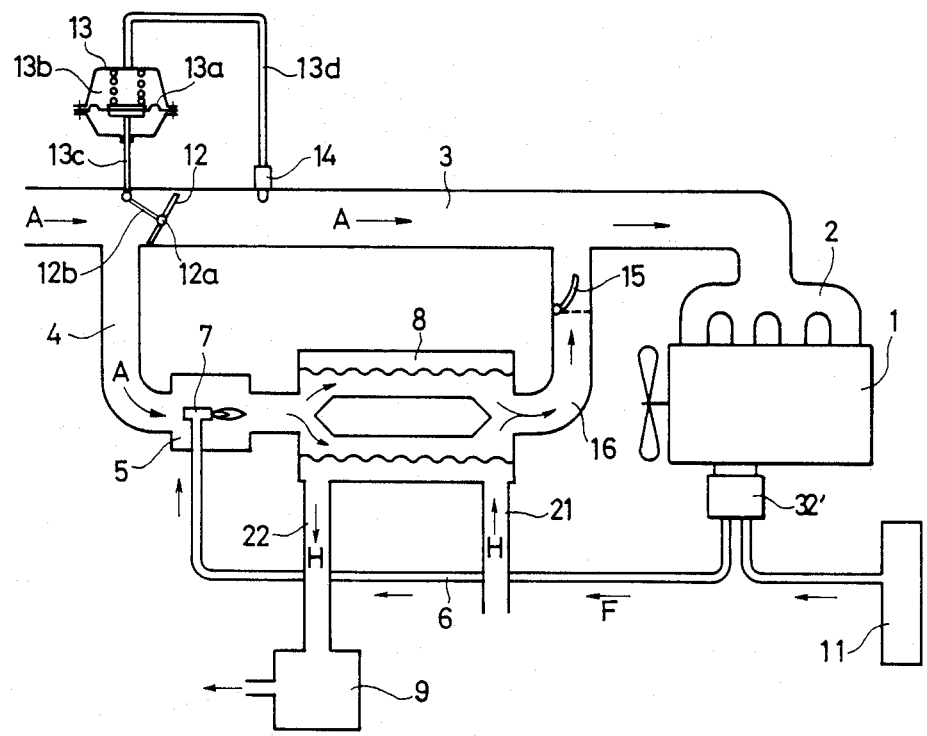
FIG. 7 is a schematic diagram of conventional engine warming-up means.

Next, the operation of the vehicle heating system having the quick heating system QHS shown in FIG. 4 will be explained. Furthermore, the operation processing state of the control unit for the vehicle heating system will be explained with reference to the change-over valve assembly 80 shown in FIGS. 2 and 3 and to the flow chart shown in FIG. 5.

First, the vehicle heating system of this invention is started. . . . (51)

Each valve is placed under the state where the air of the air cylinder is not operated, and only the quick heating system QHS can operate independently of the engine 1. Whether the operation switch 43 of the quick heating system QHS consisting of the burner 5 and the heat exchanger 8 is ON or OFF is judged. If the operation switch 43 is not ON, the flow returns to the start. When the operation switch 43 is ON, the flow proceeds to the next processing (53). . . . (52)

A current is applied to the gasification glow plug 30 and the ignition glow plug 29 in the quick heating system QHS. . . . (53)

The liquid fuel pump 32 is operated to feed the liquid fuel from the liquid fuel tank 11 into the carbureter means 7. When this pump 32 is operated, the liquid fuel is supplied to the burner 5 and the liquid fuel is gasified and turned to the gasified fuel. . . . (54)

The blower 31 is operated in order to feed the air for combustion into the burner 5. The burner 5 gasifies the liquid fuel into the gasified fuel and enters the combustion state. . . . (55)

When various components of the quick heating system QHS associated with combustion are turned ON, the liquid fuel is gasified and turned to the gasified fuel, and whether or not it is ignited is judged by detecting the temperature of the combustion gas by the temperature sensor 34 disposed at the combustion gas outlet of the heat exchanger 8, that is, at the inlet of the combustion gas passage 16. For example, whether or not the combustion gas temperature is above about 200° C. is judged. If the gas is not ignited, various controls are performed once again. If the gas is ignited, the flow proceeds to the next processing (57). . . . (56)

If the temperature of the combustion gas is above a predetermined value, the change-over value 804 (or 801) is opened. . . . (57)

The change-over valve 803 (or 802) is closed so that the hot water after heat exchange with the combustion gas of the quick heating system QHS becomes available. . . . (58)

The motor 83 for driving the water pump 81 for the heat exchanger 8 is turned ON to operate the water pump 81 and the hot water heated by the heat exchanger 8 is circulated so that it flows through the heat exchanger 8 and the cooling water heater unit 10. . . . (59)

In the cooling water heater unit 10, heat exchange is made between the hot water and the air for heating and its warm air is delivered into the cabin 28 of the car. The discharge temperature sensor 9 disposed at the outlet port to the cabin 28 judges whether the hot wind has reached a set temperature. If it has, the flow proceeds to the processing (62) and if not, the flow proceeds to the processing (61). . . . (60)

If the warm air has not reached the set temperature, whether or not any input is given from an engine revolution sensor 35 for sensing, the number of revolution of the engine 1 is judged. If there is such an input signal, the flow proceeds to the processing (63) and if not, the flow returns to the entrance of the processing (60). . . . (61)

When the warm air has reached the set temperature, the fuel pump 32 for supplying the fuel to the burner 5 is controlled and the processing (60) is repeated. . . . (62)

When there is an input signal from the engine revolution sensor 35, whether or not the temperature of the engine cooling water is above the set temperature is detected and judged by the engine water temperature sensor 45. If it is above the set temperature, the flow proceeds to the processing (64) and if not, the flow returns to the processing (60) to repeat the processing. . . . (63)

When the temperature of the engine cooling water is above the set temperature, the change-over valve 803 (or 802) in the change-over valve assembly 80 is opened while the change-over valve 804 (or 801) is closed in order to feed the engine cooling water into the cooling water heater unit 10. . . . (64)

The discharge temperature sensor 79 disposed at the outlet port to the cabin 28 judges whether or not the temperature reaches a set temperature. If it does, the flow proceeds to the processing (66) and if not, the flow returns to the processing (60) to repeat the processing. . . . (65)

When the temperature reaches the set temperature, the fuel pump 32 for supplying the fuel to the burner 5 is stopped, the operation of the heater of the quick heating system QHS is stopped, too, and the combustion is discontinued. . . . (66)

The suction return valve 46 is opened to instantaneously draw back the liquid fuel up to the carbureter means 7, in order to improve response to combustion extinguishment and the liquid fuel is recovered into the fuel tank 11. . . . (67)

The motor 83 for driving the water pump 81 is turned OFF to stop the water pump 81 for heat exchange.

The change-over valve 804 (or 801) in the change-over valve assembly 80 is closed. . . . (69)

The control of the heating operation by the quick heating system QHS in the vehicle heating system is completed. . . . (70)

Though the present invention has thus been described in detail with reference to one preferred embodiment thereof, the present invention is not particularly limited thereto. For example, various constructions can be employed for the burner and for the heat exchanger. As to the burner, for example, it may be of such a type that it turns the liquid fuel to the gasified fuel and the gasified fuel is ignited by the use of the heating plug, and the burner may be either a vertical type or a horizontal type. Various shapes and constructions can be employed for the heat exchanger, too, and various changes and modifications of the design can of course be made. Moreover, the control of water for circulation through the heat exchanger and the engine cooling water can of course be made by the use of a thermostat or the like.

What is claimed is:

1. A vehicle heating system comprising:

an engine mounted to a vehicle, said engine being equipped with an intake pipe for sending suction air into said engine and with an exhaust pipe for discharging an exhaust gas generated in said engine;

a burner mounted to said vehicle, said burner being equipped with a combustion air passage for sending air for combustion into said burner and with a combustion gas passage for discharging the combustion gas generated in said burner;

said combustion gas passage of said burner being branched to a first combustion gas passage for sending the combustion gas generated in said burner into said intake pipe and a second combustion gas passage for discharging the combustion gas generated in said burner to atmosphere;

a first change-over valve that is switched to pass the combustion gas generated in said burner to either one of said first or second combustion gas passages;

a heat exchanger mounted to said vehicle and disposed at an intermediate part of said combustion gas passage of said burner, said heat-exchanger being for effecting heat exchange between the combustion gas generated in said burner and water and for heating said water to hot water;

a heater unit mounted to said vehicle, for effecting heat exchange between said heated hot water and air for heating and sending the air for heating which is heated by said hot water into a cabin of said vehicle and heating the same;

said heater unit being equipped with a first flow path for circulating the hot water, said first flow path being connected to a second flow path for circulating cooling water of said engine and to a third flow path for circulating the hot water of said heat exchanger; and a second change-over valve that is switched to communicate said first flow path with either one of said second or third flow paths.

2. The vehicle heating system according to claim 1, wherein said second combustion gas passage for discharging the combustion gas generated in said burner to the atmosphere is connected to said exhaust pipe of said engine.

3. The vehicle heating system according to claim 1, wherein said first combustion gas passage for sending the combustion gas generated in said burner to said intake pipe of said engine is the one that connects said combustion gas passage positioned on the upstream side of said heat exchanger with said intake pipe.

4. The vehicle heating system according to claim 1, wherein said first combustion gas passage for sending the combustion gas generated in said burner to said intake pipe of said engine consists of a passage for connecting said combustion gas passage positioned on the upstream side of said heat exchanger to said intake pipe, and another passage for connecting said combustion gas passage positioned on the downstream side of said heat exchanger to said intake pipe.

* * * * *